(12) United States Patent
Jasper

(10) Patent No.: US 9,745,920 B2
(45) Date of Patent: Aug. 29, 2017

(54) GAS TURBINE NOZZLES WITH EMBOSSMENTS IN AIRFOIL CAVITIES

(71) Applicant: General Electric Company, Schenectady, NY (US)

(72) Inventor: Martin James Jasper, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 330 days.

(21) Appl. No.: 14/483,192

(22) Filed: Sep. 11, 2014

(65) Prior Publication Data

US 2016/0076483 A1  Mar. 17, 2016

(51) Int. Cl.
| | |
|---|---|
| *F01D 9/02* | (2006.01) |
| *F01D 9/04* | (2006.01) |
| *F01D 11/00* | (2006.01) |
| *F01D 5/14* | (2006.01) |
| *F01D 5/18* | (2006.01) |
| *F01D 9/06* | (2006.01) |
| *F02K 1/40* | (2006.01) |

(52) U.S. Cl.
CPC .............. *F02K 1/40* (2013.01); *F01D 5/141* (2013.01); *F01D 5/147* (2013.01); *F01D 5/188* (2013.01); *F01D 9/02* (2013.01); *F01D 9/041* (2013.01); *F01D 9/06* (2013.01); *F01D 9/065* (2013.01); *F01D 11/005* (2013.01); *F01D 9/042* (2013.01); *F01D 9/044* (2013.01); *F05D 2220/32* (2013.01); *F05D 2230/14* (2013.01); *F05D 2230/21* (2013.01); *F05D 2230/211* (2013.01); *F05D 2230/31* (2013.01); *F05D 2240/11* (2013.01); *F05D 2240/12* (2013.01); *F05D 2240/128* (2013.01); *F05D 2240/55* (2013.01); *F05D 2260/201* (2013.01)

(58) Field of Classification Search
CPC . F01D 5/147; F01D 5/188; F01D 9/02; F01D 9/041; F01D 9/06; F01D 9/065; F01D 5/141; F01D 9/042; F01D 9/044; F01D 11/005; F05D 2240/11; F05D 2240/12; F05D 2240/128; F05D 2240/55; F05D 2260/201
See application file for complete search history.

(56) References Cited

U.S. PATENT DOCUMENTS

| | | | |
|---|---|---|---|
| 5,358,374 A | * | 10/1994 | Correia .................. F01D 5/081 415/115 |
| 6,416,275 B1 | | 7/2002 | Itzel et al. |
| 6,453,557 B1 | | 9/2002 | Burdgick |
| 7,121,796 B2 | | 10/2006 | Burdgick et al. |
| 8,353,668 B2 | | 1/2013 | Propheter-Hickley et al. |
| 2002/0028134 A1 | * | 3/2002 | Burdgick ................ F01D 9/04 415/116 |
| 2004/0208748 A1 | * | 10/2004 | Schwartz ................ F01D 5/189 416/224 |

(Continued)

*Primary Examiner* — Gerald L Sung
*Assistant Examiner* — Scott Walthour
(74) *Attorney, Agent, or Firm* — Eversheds Sutherland (US) LLP

(57) ABSTRACT

The present application provides a nozzle for a gas turbine engine. The nozzle may include a band, a seal slot positioned within the band, an airfoil extending from the band, a cavity within the airfoil, and an embossment positioned about the band and the cavity.

17 Claims, 3 Drawing Sheets

(56) References Cited

U.S. PATENT DOCUMENTS

2005/0089395 A1\* 4/2005 Texier ................... F01D 5/188
                                                    415/115
2009/0074562 A1\* 3/2009 Self ........................ F01D 5/187
                                                    415/115

\* cited by examiner

GAS TURBINE NOZZLES WITH EMBOSSMENTS IN AIRFOIL CAVITIES

TECHNICAL FIELD

The present application and the resultant patent relate generally to gas turbine engines and more particularly relate to a gas turbine nozzle with an airfoil cavity embossment so as to limit seal slot breakage into the cavity and for enhanced overall airfoil cooling.

BACKGROUND OF THE INVENTION

Impingement cooling systems have been used with turbine machinery to cool various types of components such as casings, buckets, nozzles, and the like. Impingement cooling systems cool these components via an airflow so as to maintain adequate clearances between the components and to promote adequate component lifetime. One issue with some types of known impingement cooling systems, however, is that they tend to require complicated casting and/or structural welding. Such complicated structures may not be sufficiently durable and/or they may be expensive to produce and repair.

By way of example, an impingement cooling insert may be positioned within a nozzle airfoil cavity. Nozzle ribs may be machined into the cavity for positioning the cooling insert therein. The ends of the ribs may need to be machined to achieve a proper interface for welding or brazing the cooling insert therein. Such procedures are generally time consuming and expensive. Moreover, part life may be reduced due to air leakage across the joints or otherwise.

There is thus a desire for an improved turbine nozzle. Preferably such an improved turbine nozzle may provide for the fast and efficient insertion of an impingement cooling insert therein without expensive casting or machining while providing adequate cooling for a prolonged component lifetime and overall system efficiency.

SUMMARY OF THE INVENTION

The present application and the resultant patent provide a nozzle for a gas turbine engine. The nozzle may include a band, a seal slot positioned within the band, an airfoil extending from the band, a cavity within the airfoil, and an embossment positioned about the band and the cavity.

The present application and the resultant patent further provide a method of manufacturing a nozzle for a gas turbine engine. The method may include the steps of casting an airfoil with a cavity and a band, adding an embossment with a curved configuration about the cavity and the band, and machining a seal slot into the band about the embossment.

The present application and the resultant patent further provide a nozzle for a gas turbine engine. The nozzle may include a band, a seal slot machined within the band, an airfoil extending from the band, a cavity within the airfoil, an impingement cooling insert positioned within the cavity, and an embossment cast about the band and the cavity. The embossment may have a curved configuration.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
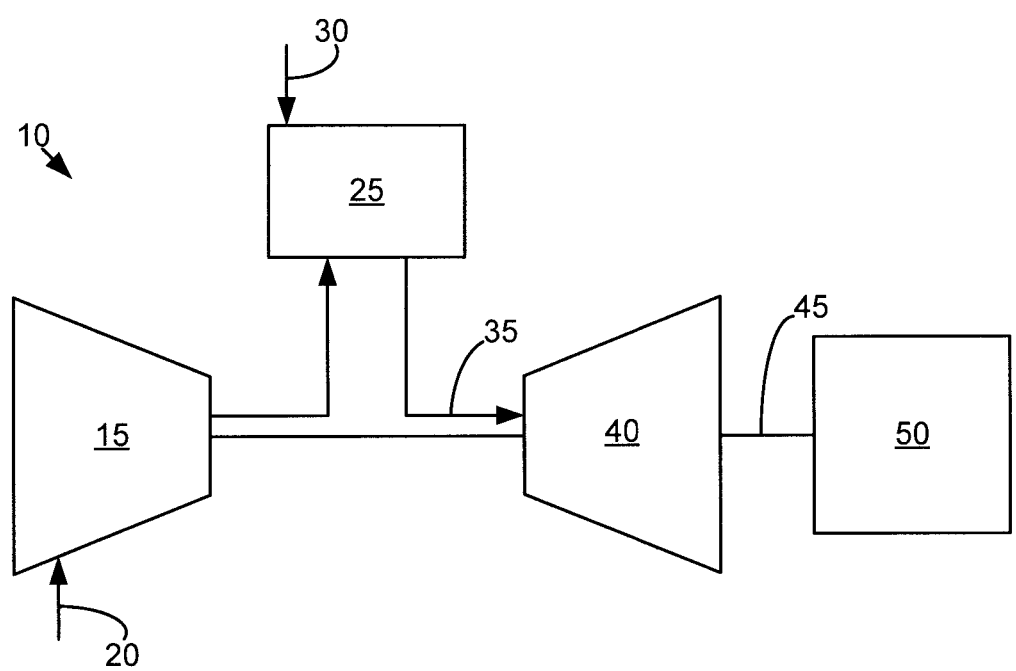
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array or otherwise. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
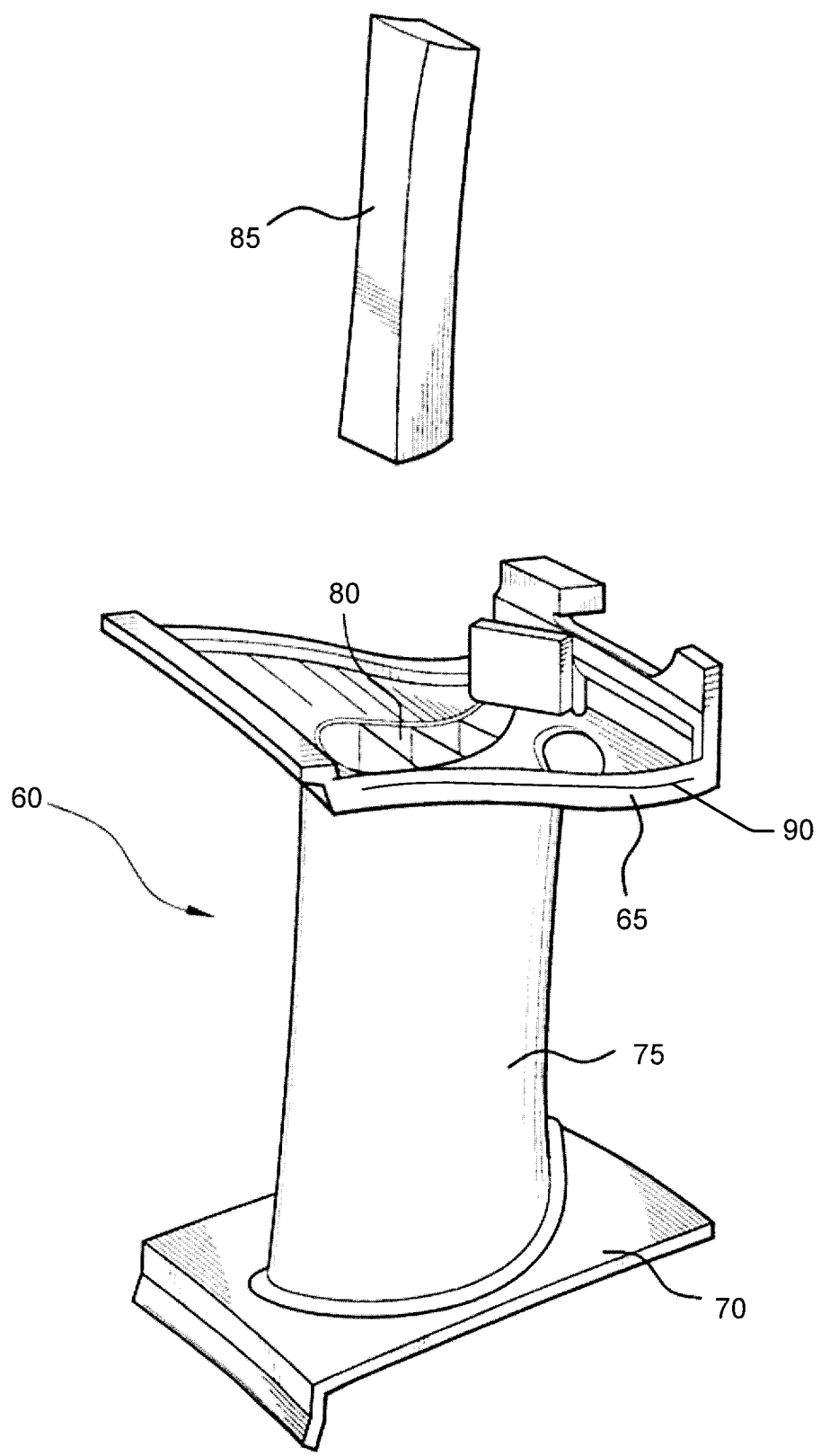
FIG. 2 is a perspective view of a nozzle with an impingement cooling insert.

FIG. 2 shows an example of a nozzle 60 that may be used with the turbine 40 and the like. Any number of the nozzles 60 may be positioned in a circumferential array about a gas turbine axis. Generally described, the nozzle 60 may include an outer band 65, an inner band 70, and one or more airfoils 75 extending therebetween. The airfoil 75 may have one or more cavities 80 therein. A cooling insert 85 may be positioned in one or more of the cavities 80. The cooling insert 85 may have a number of apertures therethrough for impingement cooling the internal wall surfaces of the airfoil 75 via a cooling medium such as steam and the like. The outer band 65 and/or the inner band 70 also may have one or more seal slots 90 formed therein. A seal may be positioned within the seal slots 90 of adjoining nozzles 60 to prevent the passage of the hot combustion gasses 35 therethrough. The nozzle 60 described herein is for the purpose of example only. Many other and different types of nozzle configurations may be used.

Figure 3:
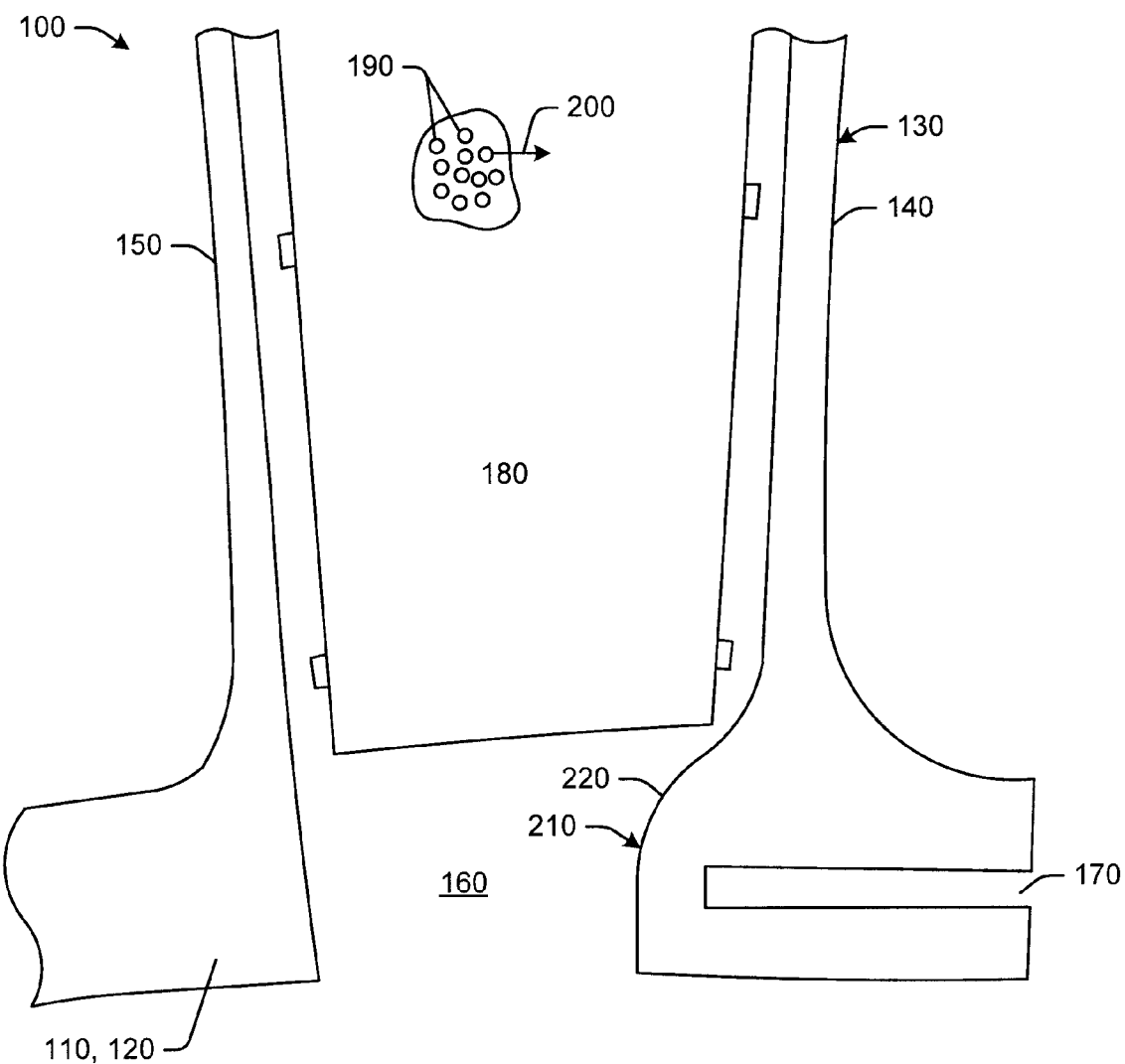
FIG. 3 is a partial sectional view of a turbine nozzle with an impingement cooling insert as may be described herein.

FIG. 3 shows an example of a turbine nozzle 100 as may be described herein. The turbine nozzle 100 may include an outer band 110 and an inner band 120 (only one of which is shown). An airfoil 130 may extend between the outer band 110 and the inner band 120. More than one airfoil 130 may be used. The airfoil 130 may have a leading sidewall 140 and a trailing sidewall 150. The sidewalls 140, 150 may define an airfoil cavity 160 therebetween. One or more seal slots 170 may be positioned in or about the outer band 110 and the inner band 120 for one or more seals to extend therebetween. The turbine nozzle 100 and the components thereof may have any suitable size, shape, or configuration.

The turbine nozzle 100 may include a cooling insert 180 positioned within the airfoil cavity 160. The cooling insert 180 may include a number of apertures 190 therein. Any number of the apertures 190 may be used herein. The cooling insert 180 and the apertures 190 may have any suitable size, shape, or configuration. The apertures 190 of the cooling insert 180 allows for the passage of a cooling medium 200 therethrough so as to cool the sidewalls 140, 150 and other surfaces of the airfoil 130 by impingement thereon. The cooling medium 200 may be steam and the like. Other types of cooling mediums may be used herein. Other components and other configurations may be used herein.

The turbine nozzle 100 also may include one or more embossments 210. The embossment 210 may be an amount of additional airfoil material. The embossment 210 may be cast, extruded, or otherwise formed therein. The embossment 210 may be positioned about the airfoil cavity 160 in proximity to the seal slot 170. The embossment 210 may have a substantially curved configuration 220. The curved configuration 220 of the embossment 210 may extend into the airfoil cavity 160 at about a forty-five degree (45°) angle or so. Other angles and other types of curved configurations may be used herein. Specifically, the fillets and the leading angles of the embossment 210 may be large enough so as to enable high quality castability. Moreover, the length, the height, the size, the shape, and the configuration of the embossment 210 may vary. Nozzles 100 with varying embossments 210 may be used together. Other components and other configurations may be used herein.

The cooling insert 180 may or may not contact the embossment 210. If in contact, the embossment 210 may serve as a last minute engagement standoff. Specifically, the standoff may be a platform for the airfoil cooling inserts. Use as the engagement standoff thus may enhance overall airfoil cooling and cooling efficiency herein.

The use of the embossment 210 increases the overall design space of the turbine nozzle 100. Specifically, the extra material of the embossment 210 allows the seal slots 170 to be machined therein without concern of breaking into the airfoil cavity 160. The seal slots 170 thus may have a sufficient seal depth to resist seal pull out and/or seal destruction. Breaking into the airfoil cavity 160 may cause a cooling flow leakage and associated reduced part life and overall performance. Moreover, a smaller overall slashface angle may be used on the inner and outer bands 110, 120. The use of the embossment 210 thus avoids a reduced seal slot depth as well as an increased slashface angle.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A nozzle for a turbine section of a gas turbine engine, comprising:
   a band having an inner contour, a forward edge disposed opposite an aft edge, and a side edge extending from the forward edge to the aft edge;
   a seal slot within the side edge of the band;
   an airfoil extending from the band;
   a cavity within the airfoil, the cavity being defined by a leading sidewall of the airfoil, a trailing sidewall of the airfoil, and the inner contour of the band; and
   an embossment positioned at the inner contour of the band and extending into the cavity;
   wherein the leading sidewall of the airfoil extends from a leading edge of the airfoil to a trailing edge of the airfoil, the leading edge of the airfoil being located at a forward portion of the band proximate the forward edge of the band, the trailing edge of the airfoil being located at an aft portion of the band proximate the aft edge of the band, and a portion of the leading sidewall being located proximate the side edge of the band; and
   wherein the seal slot extends from the side edge of the band into the embossment.

2. The nozzle of claim 1, wherein the band is one of an outer band and an inner band.

3. The nozzle of claim 1, further comprising a cooling insert positioned within the cavity.

4. The nozzle of claim 3, wherein the cooling insert is an impingement cooling insert.

5. The nozzle of claim 3, wherein the cooling insert comprises a plurality of apertures therein.

6. The nozzle of claim 3, wherein the cooling insert is in contact with the embossment and the embossment provides a standoff.

7. The nozzle of claim 3, wherein a cooling medium passes through the cooling insert to cool the airfoil.

8. The nozzle of claim 1, wherein the embossment comprises a curved configuration that reduces a width of the cavity adjacent to the band.

9. The nozzle of claim 8, wherein the curved configuration comprises an angle of about forty-five degrees (45°) into the cavity.

10. The nozzle of claim 1, wherein the embossment comprises an amount of cast material extending within the cavity.

11. The nozzle of claim 1, wherein the seal slot is machined into the band.

12. The nozzle of claim 1, wherein the band comprises an angled slashface thereon.

13. A nozzle for a turbine section of a gas turbine engine, comprising:
   a band having an inner contour, a forward edge disposed opposite an aft edge, and a side edge extending from the forward edge to the aft edge;
   a seal slot machined within the side edge of the band;
   an airfoil extending from the band;
   a cavity within the airfoil, the cavity being defined by a leading sidewall of the airfoil, a trailing sidewall of the airfoil, and the inner contour of the band;
   an impingement cooling insert positioned within the cavity; and
   an embossment cast at the inner contour of the band and extending into the cavity, wherein the embossment comprises a curved configuration;
   wherein the leading sidewall of the airfoil extends from a leading edge of the airfoil to a trailing edge of the airfoil, the leading edge of the airfoil being located at a forward portion of the band proximate the forward edge of the band, the trailing edge of the airfoil being located at an aft portion of the band proximate the aft edge of the band, and a portion of the leading sidewall being located proximate the side edge of the band,
   wherein the seal slot extends from the outer edge of the band into the embossment.

14. The nozzle of claim 13, wherein the impingement cooling insert comprises a plurality of apertures therein.

15. The nozzle of claim 13, wherein the impingement cooling insert is in contact with the embossment and the embossment provides a standoff.

16. The nozzle of claim 13, wherein a cooling medium passes through the impingement cooling insert to cool the airfoil.

17. The nozzle of claim 13, wherein the curved configuration comprises an angle of about forty-five degrees (45°) into the cavity.

* * * * *